(12) United States Patent
Yuhasz (10) Patent No.: US 10,619,025 B2
(45) Date of Patent: Apr. 14, 2020

(54) PINK AND VIOLET PIGMENTS THAT DISPLAY HEAT STABILITY, RESISTANCE TO ACIDIC CONDITIONS, AND GOOD LIGHTFASTNESS

(71) Applicant: The Shepherd Color Company, Cincinnati, OH (US)

(72) Inventor: William M. Yuhasz, West Chester, OH (US)

(73) Assignee: The Shepherd Color Company, Cincinnati, OH (US)

( * ) Notice: Subject to any disclaimer, the term of this patent is extended or adjusted under 35 U.S.C. 154(b) by 534 days.

(21) Appl. No.: 15/584,312

(22) Filed: May 2, 2017

(65) Prior Publication Data

US 2018/0258253 A1  Sep. 13, 2018

Related U.S. Application Data

(60) Provisional application No. 62/330,563, filed on May 2, 2016.

(51) Int. Cl.
| | |
|---|---|
| *C09C 1/00* | (2006.01) |
| *C09D 5/03* | (2006.01) |
| *C08K 3/013* | (2018.01) |
| *C01G 51/00* | (2006.01) |
| *C01G 53/00* | (2006.01) |
| *C08K 3/01* | (2018.01) |

(52) U.S. Cl.
CPC ............ *C08K 3/013* (2018.01); *C01G 51/006* (2013.01); *C01G 53/006* (2013.01); *C08K 3/01* (2018.01); *C09C 1/00* (2013.01); *C09C 1/0096* (2013.01); *C09D 5/031* (2013.01); *C09D 5/033* (2013.01); *C09D 5/035* (2013.01); *C01P 2002/82* (2013.01); *C01P 2002/84* (2013.01); *C01P 2006/62* (2013.01); *C01P 2006/63* (2013.01); *C01P 2006/64* (2013.01); *C01P 2006/65* (2013.01); *C01P 2006/66* (2013.01)

(58) Field of Classification Search
CPC ........ C08K 3/013; C08K 3/01; C01G 51/006; C01G 3/006; C09C 1/00; C09C 1/0096; C09D 5/031; C09D 5/033; C09D 5/035; C01P 2002/84; C01P 2006/62; C01P 2006/63; C01P 2006/65; C01P 2006/66
See application file for complete search history.

(56) References Cited

U.S. PATENT DOCUMENTS

| 5,846,505 | A | * | 12/1998 | Saegusa | ................... | C01B 13/14 423/263 |
|---|---|---|---|---|---|---|
| 5,972,097 | A | * | 10/1999 | Maki | ..................... | C09C 1/0009 106/428 |
| 10,202,510 | B2 | * | 2/2019 | Yuhasz | ................. | C01G 30/026 |
| 2007/0042273 | A1 | * | 2/2007 | Jumas | .................. | C01G 23/003 429/322 |
| 2016/0122548 | A1 | | 5/2016 | Yuhasz et al. | | |

FOREIGN PATENT DOCUMENTS

| JP | H08-208226 A | 8/1996 |
|---|---|---|
| JP | H10-219134 A | 8/1998 |
| JP | 2004-131313 A | 4/2004 |
| JP | 2018-500268 A | 1/2018 |
| WO | WO 2016/073354 A1 | 5/2016 |

OTHER PUBLICATIONS

Tarte, Pierre; Gabelica-Robert, Melanie: "New Antimonate and Tellurate Complexes Structurally Related to Lithium Antimonate LiSb03", Comptes Rendus Des Seances De L'academie Des Sciences, Serie 2: Mecanique-Physique, Chimie, Sciences De La Terre, vol. 296, No. 4, (1983): 261-264.

Knapp, Meghan C., and Patrick M. Woodward. "A-site cation ordering in AA' BB' O 6 perovskites." Journal of Solid State Chemistry 179.4 (2006): 1076-1085.

Blanco, M. Cecilia, et al. "Synthesis and Characterization of ohe New Two-Dimensional Heisenberg Antiferromagnet Double Perovskite BaLaCuSbO 6." Dalton Transactions 44.23 (2015): 10860-10866.

Yu, Jin-Peng, et al. "The Investigation of LiCo 1-x Sb x O 2 as a Promising Cathode Material for Lithium-Ion Batteries." Electrochimica Acta 121 (2014): 301-306.

International Search Report and Written Opinion for PCT Application No. PCT/US2017/030534, dated Sep. 1, 2017.

* cited by examiner

*Primary Examiner* — Pegah Parvini
(74) *Attorney, Agent, or Firm* — Frost Brown Todd LLC (57) ABSTRACT

There are very few violet or pink colored commercial pigments that display high heat stability, resistance to acidic conditions, or good lightfastness. This technology results in pigments that fall into the above color space, but display improved chemical and weathering stability. The pigments based of this technology have the molar ratio $(A_2O)_x$ $(BO)_y(C_2O_5)_z(DO_3)_w(EO_2)_v$, where $2x+y+2z+w+v \cong 100$. Where A is Li or Li with one or more of Cu, Na, or K, where B is Co or Co with one or more of Ca, Cu, Fe, Mg, Mn, Ni, Sn, or Zn, where C is Nb, Sb, or combination thereof, where D is Mo, W or combination thereof, where E is Sn, Ti, Zr, or combination thereof. The above formulation may be modified with a dopant addition of Al, B, Ba, Bi, Ca, Ce, Cr, La, P, Pr, Si, Sr, Ta, V, or Y where the dopant concentration represents 5 atomic % or less of the total number of moles of components A+B+C+D+E.

25 Claims, 8 Drawing Sheets

PINK AND VIOLET PIGMENTS THAT DISPLAY HEAT STABILITY, RESISTANCE TO ACIDIC CONDITIONS, AND GOOD LIGHTFASTNESS

RELATED APPLICATIONS

This application claims the benefit of priority to U.S. provisional application No. 62/330,563, titled "Pink and violet pigments that display heat stability, resistance to acidic conditions, or good lightfastness," filed May 2, 2016, the entire contents of which are hereby incorporated by reference.

BACKGROUND

Figure 1:
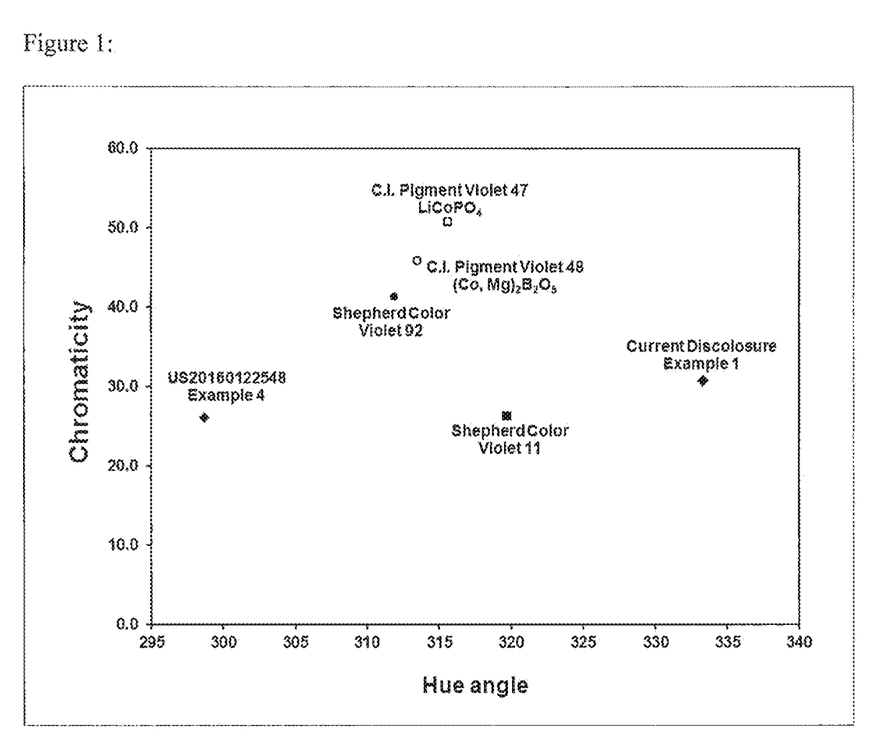
FIG. 1: Chromaticity as a function of hue angle for various violet pigments. CIE color values were measured on PVDF/Acrylic masstone drawdowns using a Perkin Elmer Lambda 900 spectrophotometer (D65 illuminant and 10° Standard Observer).

There are very few violet or pink colored commercial complex inorganic pigments that display desired coloristic qualities along with high heat stability, resistance to acidic conditions, or good lightfastness. Current commercial pigments that include C.I. Pigments Violet 14 ($Co_3(PO_4)_2$), Violet 47 ($LiCoPO_4$), and Violet 48 (($Co, Mg)_2B_2O_5$) are heat stable but are not stable in acid and are not lightfast. FIG. 1 illustrates chromaticity ($\sqrt{(a^*)^2+(b^*)^2}$) versus hue angle $$\left(\tan^{-1}\left(\frac{b^*}{a^*}\right)\right)$$

for the violets presented above where a* and b* color values (using CIELAB color space coordinates) are measured on PVDF/Acrylic masstone drawdowns using a Perkin Elmer Lambda 900 spectrophotometer. The higher the chromaticity the more intense the color and for the hue angle range displayed the redness increases as the hue angle increases. The majority of compositions in this disclosure result in pigments with a hue angle greater than 320°.

BRIEF SUMMARY

This disclosure relates to inorganic pigments with the following molar ratio $(A_2O)_x(BO)_y(C_2O_5)_z(DO_3)_w(EO_2)_v$, 5≤x≤20,
10≤y≤45,
17≤z≤30,
0≤w≤5,
0≤v≤5, where 2x+y+2z+w+v≅100, where A is Li or Li with one or more of Cu, Na, or K, where B is Co or Co with one or more of Ca, Cu, Fe, Mg, Mn, Ni, Sn, or Zn, where C is Nb, Sb, or combination thereof, where D is Mo, W or combination thereof, where E is Sn, Ti, Zr, or combination thereof. The above formulation may be modified with a dopant addition of Al, B, Ba, Bi, Ca, Ce, Cr, La, P, Pr, Si, Sr, Ta, V, or Y where the dopant concentration represents 5 atomic % or less of the total number of moles of components A+B+C+D+E. The term dopant is used to refer to substitutions that result in cation or anion deficiencies and nonstoichiometry without substantially changing the structure.

The inorganic pigments may also have the following molar ratio $(A_2O)_x(BO)_y(C_2O_5)_z(DO_3)_w(EO_2)_v$, where:

7≤x≤17.5
15≤y≤40
20≤z≤26
0≤v≤5; and
where 2x+y+2z+w+v≅100.

In such cases, greater than 50 atomic % of A is Li, greater than 50 atomic % of B is Co, greater than 50 atomic % of C is Sb, and where A is Li, B is Co and C is Sb. In some examples, at least 5 atomic % of A is Cu, Na, or K. Also, at least 5 atomic % of B is Cu, Ni, Mg, or Zn. Also, at least 5 atomic % of C may be Nb. With this pigment, w>0, v>0, and where v=w and v>0. Inorganic pigment dopants may include Al, B, Ba, Bi, Ca, Ce, Cr, La, P, Pr, Si, Sr, Ta, V, or Y, where the dopant concentration represents 5 atomic % or less of the total number of moles of components A+B+C+D+E.

An inorganic may also have the following molar ratio: $(A_2O)_x(BO)_y(C_2O_5)_z(DO_3)_w(EO_2)_v$, where:

10≤x≤15
20≤y≤30
20≤z≤26
0≤w≤5
0≤v≤5, and
where 2x+y+2z+w+v≅100.

In this instance, greater than 50 atomic % of A is Li, greater than 50 atomic % of B is Co, greater than 50 atomic % of C is Sb, A is Li, B is Co and C is Sb. Also, at least 5 atomic % of A is Cu, Na, or K, and at least 5 atomic % of B is Cu, Ni, Mg, or Zn. Also, at least 5 atomic % of C is Nb, and where w>0, v>0, and v=wand v>0. Dopant may include Al, B, Ba, Bi, Ca, Ce, Cr, La, P, Pr, Si, Sr, Ta, V, or Y where the dopant concentration represents 5 atomic % or less of the total number of moles of components A+B+C+D+E.

DETAILED DESCRIPTION

Figure 2:
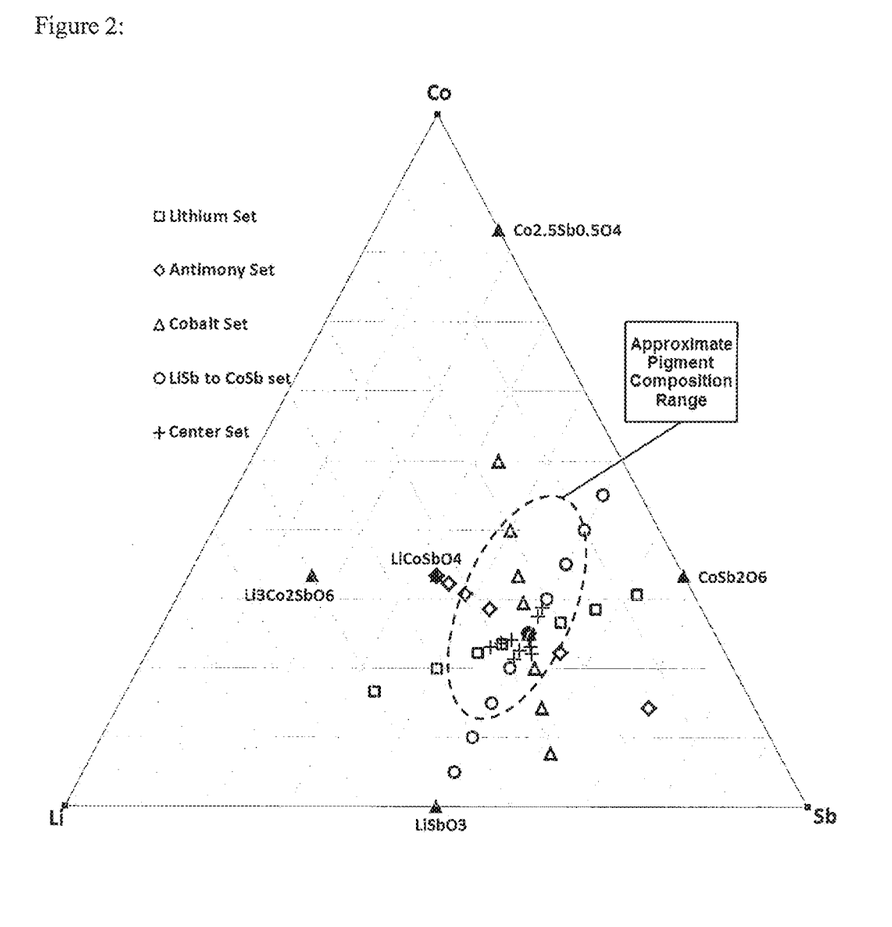
FIG. 2: Ternary phase diagram for Li—Co—Sb oxide compositions from table 1. The dashed circle approximates the pink/violet phase space of interest. Known Li—Co—Sb compounds are included for reference.

The following technology pertains to new red shade violet/pink pigments based on the Li—Co—Sb oxide ternary phase space. The pigments of this technology exhibit chemical and weathering stability superior to commercially available violet pigments. The composition space of the current technology is displayed in a Li—Co—Sb oxide ternary phase diagram in FIG. 2 with compositions and color listed in Table 1. The dashed region in FIG. 2 is an approximation of the primary phase space of this technology. The various compositions marked in the dashed region are part of 5 different composition sets. The "Antimony set" refers compositions fired at 1,150° C. that start at $LiCoSbO_4$ and follow a line of increasing antimony content. The color of the compositions along this line start at a green shade blue at $LiCoSbO_4$ and as the antimony content increases the color stays a green shade blue then becomes a blue/black then violet and becomes a bright pink at 50 atomic % antimony. As the antimony content increases beyond the bright pink the color shifts to tan and finishes a pastel peach at 71 atomic % antimony. The "Lithium set" is centered at the bright pink composition and looks at variations in lithium content. Along this composition line with increasing lithium the color shifts from bright pink at the center starting point to a red shade violet then burgundy, blue/black, and olive gray at 50 atomic % lithium. As the lithium content is reduced the bright pink shifts to a salmon color and then peach and finishes at a pastel tan coloration at 8 atomic % cobalt. Along the "Cobalt set" of compositions the region of violet color is slightly extend.

Just as in the "Lithium set" the cobalt set is centered at the bright pink composition. As the cobalt content increases the bright pink shifts to a red shade violet and then remains a similar coloration with increasing cobalt and then shifts to a red shade purple and finishes at a purple/black coloration at 50 atomic % cobalt. As cobalt is removed from the bright pink composition the color goes from a light salmon to a tan/peach and then a pastel tan at 8 atomic % cobalt. The composition set labeled "LiSb—CoSb set" is again centered on the bright pink composition (Li—Co-2Sb) but looks at the line connecting $LiSbO_3$ to $CoSbO_3$. Starting at the center bright pink composition and increasing lithium and antimony content the color initially stays bright pink and gradually fades to a pastel pink at the highest $LiSbO_3$ content.

In the direction of increasing $CoSbO_3$ content the color initially stays a bright pink and then shifts to a red shade violet then brown and an olive/brown at the highest $CoSbO_3$ content. The final "center set" of compositions looks at smaller shifts in composition about the bright pink composition (Li—Co-2Sb). The first three compositions in the set remove cobalt from Li—Co-2Sb and quickly shift the color to a pastel red. The next three compositions look at slightly elevated levels of lithium in (Li—Co-2Sb) and show a rapid shift from bright pink to a red shade violet to violet to purple at (1.35Li—Co-2Sb). The final four compositions in the set simply confirm that the bright pink coloration exists over a broad composition range along the composition line connecting $LiSbO_3$ and $CoSbO_3$.

A composition range that encloses the pink and violet colorations can be described by the following molar ratio $(A_2O)_x(BO)_y(C_2O_5)_z$,
5≤x≤20,
10≤y≤45,
17≤z≤30,
where 2x+y+2z≅100 and A is Li, B is Co, and C is Sb.

TABLE 1

Composition and color for Li—Sb—Co compositions reacted at 1,150° C.

| | Composition (at %) | | | |
|---|---|---|---|---|
| | Li | Sb | Co | Color at 1,150° C. |
| Antimony Set | 33.3 | 33.3 | 33.3 | Green shade blue |
| | 32.3 | 35.5 | 32.3 | Green shade blue |
| | 30.8 | 38.5 | 30.8 | Dark blue/black |
| | 28.6 | 42.9 | 28.6 | Purple |
| | 25.0 | 50.0 | 25.0 | Bright pink |
| | 22.2 | 55.6 | 22.2 | Orange/tan |
| | 14.3 | 71.4 | 14.3 | Pastel peach |
| Lithium Set | 50.0 | 33.3 | 16.7 | Olive/gray |
| | 40.0 | 40.0 | 20.0 | Blue shade black |
| | 33.3 | 44.4 | 22.2 | Dark burgandy |
| | 29.4 | 47.1 | 23.5 | Red shade violet |
| | 25.0 | 50.0 | 25.0 | Bright pink |
| | 20.0 | 53.3 | 26.7 | Salmon |
| | 14.3 | 57.1 | 28.6 | Peach |
| | 7.7 | 61.5 | 30.8 | Pastel tan |
| Cobalt Set | 16.7 | 33.3 | 50.0 | Purple/black |
| | 20.0 | 40.0 | 40.0 | Red shade purple |
| | 22.2 | 44.4 | 33.3 | Red shade violet |
| | 23.5 | 47.1 | 29.4 | Red shade violet |
| | 25.0 | 50.0 | 25.0 | Bright pink |
| | 26.7 | 53.3 | 20.0 | Light salmon |
| | 28.6 | 57.1 | 14.3 | Tan/peach |
| | 30.8 | 61.5 | 7.7 | Pastel tan |
| LiSb—CoSb Set | 5.0 | 50.0 | 45.0 | Olive/brown |
| | 10.0 | 50.0 | 40.0 | Brown |
| | 15.0 | 50.0 | 35.0 | Red shade violet |
| | 20.0 | 50.0 | 30.0 | Bright pink |
| | 25.0 | 50.0 | 25.0 | Bright pink |
| | 30.0 | 50.0 | 20.0 | Bright pink |
| | 35.0 | 50.0 | 15.0 | Pink |
| | 40.0 | 50.0 | 10.0 | Light pink |
| | 45.0 | 50.0 | 5.0 | Pastel pink |
| Center Set | 25.3 | 50.6 | 24.1 | Bright pink |
| | 25.6 | 51.3 | 23.1 | Pastel red |
| | 26.0 | 51.9 | 22.1 | Pastel red |
| | 31.0 | 46.0 | 23.0 | Purple |
| | 29.4 | 47.1 | 23.5 | Violet |
| | 27.7 | 48.2 | 24.1 | Red shade violet |
| | 27.5 | 50.0 | 22.5 | Bright pink |
| | 28.8 | 50.0 | 21.3 | Bright pink |
| | 22.5 | 50.0 | 27.5 | Bright pink |
| | 21.3 | 50.0 | 28.8 | Bright pink |

Examples 4 through 27 below show how various substitutions can alter the color of the bright pink composition (Li—Co-2Sb). The compositions and color for these examples are listed in Tables 2 to 5. Examples 4 and 5 show that if lithium is replaced by copper(I) in the formulation the fired product is pastel red in color. In the case of sodium substitution for lithium Examples 6 and 7 do not show a significant change in color. While substitution with potassium in Examples 8 and 9 results in a drastic color shift from bright pink to dull violet. Examples 10 to 13 and 23 to 25 show that as cobalt is replaced by magnesium the color simply becomes more dilute shifting from light pink to a pastel pink and finally a white with magnesium completely replacing cobalt.

Examples 14 and 15 show that substituting molybdenum or tungsten for antimony seem to have a similar effect with a color shift from bright pink to pastel reds. In Example 16 when molybdenum and titanium are both substituted for antimony the color shifts to a red shade violet. The combination of tungsten and titanium substituted for antimony results a red/brown shade for Example 17. Examples 18 and 21 replace cobalt with copper(II) and shift the color to pastel reds similar to what is observed with copper(I) substitutions for lithium. In Examples 19 and 20, antimony is substituted with niobium, shifting the color from bright pink to violet with increasing niobium. Examples 26 and 27 show a shift from bright pink to a pink that is darker but less red and less blue as cobalt is substituted with zinc.

When considering the various substitutions that can be made for one or more of lithium, cobalt, and antimony the composition range of interest is now described by the following molar ratio $(A_2O)_x(BO)_y(C_2O_5)_z(DO_3)_w(EO_2)_v$, $5 \leq x \leq 20$,
$10 \leq y \leq 45$,
$17 \leq z \leq 30$,
$0 \leq w \leq 5$,
$0 \leq v \leq 5$, where $2x+y+2z+w+v \cong 100$.

In this scenario, A is Li or Li with one or more of Cu, Na, or K, where B is Co or Co with one or more of Ca, Cu, Fe, Mg, Mn, Ni, Sn, or Zn, where C is Nb, Sb, or combination thereof, where D is Mo, W or combination thereof, where E is Sn, Ti, Zr, or combination thereof. The above formulation with a dopant addition of Al, B, Ba, Bi, Ca, Ce, Cr, La, P, Pr, Si, Sr, Ta, V, or Y where the dopant concentration represents 5 atomic % or less of the total number of moles of components A+B+C+D+E. The term dopant is used to refer to substitutions that result in cation or anion deficiencies and nonstoichiometry without substantially changing the structure.

Potential uses for these materials may be in sol-gel type coatings and coil coatings (PVDF, polyester) as well as in cement, roofing granules, paint, ink, glass, enamel, ceramic glaze, plastics, sol-gel coatings, or decorative cosmetic applications.

The pigment may be incorporated into, or synthesized as part of, a composite material to either impart a benefit or functionality to the composite to improve or enhance a property of the pigment.

Synthetic Routes:

The compositions mentioned above may be produced by a variety of methods. These methods may include solid state synthesis, solution synthesis (hydrothermal, precipitation, flame spray pyrolysis, and combustion synthesis), and ion exchange (through solution or molten salt techniques). In the case of the solid state synthesis technique, appropriate elemental precursors (including oxides, carbonates, hydroxides, etc.) at the desired stoichiometry are intimately mixed and fired to achieve the final pigment composition. The elemental precursors may be dry blended as powders or wet blended as a slurry to achieve a uniform mixture. During the firing process, parameters such as temperature, dwell time, and atmosphere may be controlled. The firing temperature may range from 500° C. to 1,300° C. The optimal firing temperature will vary based on the pigment composition, the selection of precursors, the method of blending/mixing precursors, the desired color, the desired crystallite size, the desired particle size, the atmosphere during firing, etc. Dwell times during firing may also be varied from 30 minutes to a few hours or even more than a day to achieve the desired characteristics for a given application. The atmosphere during firing may also be varied (air, oxidizing, reducing, inert) to achieve a desired oxidation state in the fired product. Following the firing process the resulting material may be pulverized and/or milled to the desired size scale and color.

Those skilled in the art may also use a mineralizer or flux additive during the firing process. Such an additive will typically assist in the formation of the desired crystalline phase, and/or aid in diffusion of reactive species. Potential benefits from using these additives include a reduction in firing temperature which may minimize the loss of volatile constituents. A few common mineralizers include tungsten oxide, molybdenum oxide, boric acid, and boron oxide.

The surface of the resulting pigment may be coated/treated to add functionalization, improve dispersion, or enhance stability in various applications. Methods for coating the final product are well known, for example inorganic coatings based on silica have been taught in U.S. Pat. Nos. 2,885,366A and 5,851,587A.

EXAMPLES

Example 1

Figure 5:
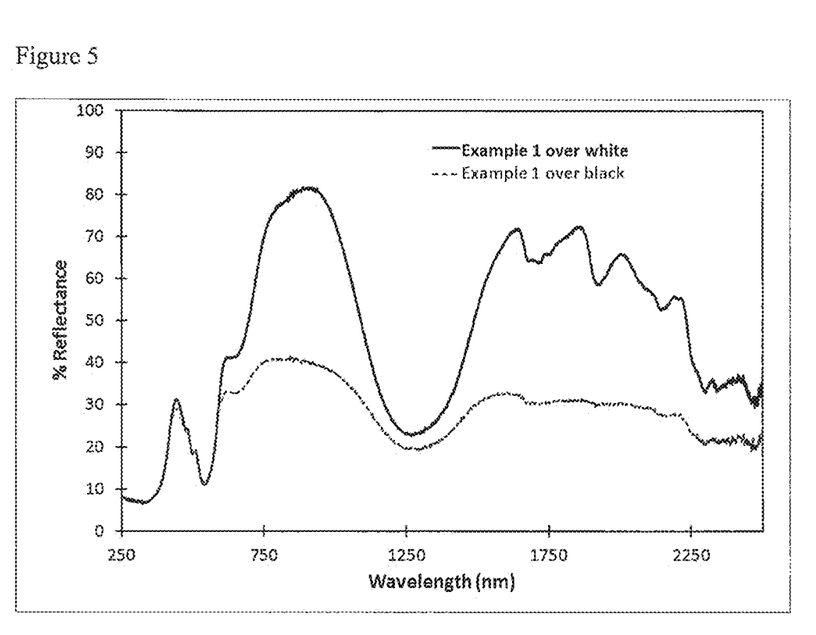
FIG. 5: Reflectance spectrum for an acrylic masstone drawdown of Example 1 measured from 250 to 2,500 nm over the white and black portions of a Leneta card.

A mixture of 24.58 grams cobalt oxide ($Co_3O_4$), 11.30 grams of lithium carbonate ($Li_2CO_3$), and 89.12 grams of antimony trioxide ($Sb_2O_3$) was homogenized using a Waring blender and calcined between 1,010° C. and 1,150° C. for 4 hours. The resulting material is bright pink which can be milled to a pigmentary particle size (>5 μm) that is pink in coloration. See the reflectance spectra for Example 1 as milled in FIG. 5. See the color for Example 1 in PVDF/acrylic masstone drawdowns in Table 7 along with the mean particle size after milling.

Examples 2-9

Mixtures of cobalt oxide ($Co_3O_4$), cobalt carbonate ($CoCO_3$), cobalt hydroxide ($Co(OH)_3$) lithium carbonate ($Li_2CO_3$), antimony trioxide ($Sb_2O_3$), cuprous oxide ($Cu_2O$), sodium carbonate ($Na_2CO_3$), and potassium carbonate ($K_2CO_3$) were weighed out in proportions according to the molar amounts listed in Table 2. The mixtures were homogenized by mortar and pestle and calcined in air at 1,100° C. for 4 hours. After firing, the color of the final product is listed in Table 5 and ranged from bright pink to pastel red.

Examples 10-18

Figure 3:
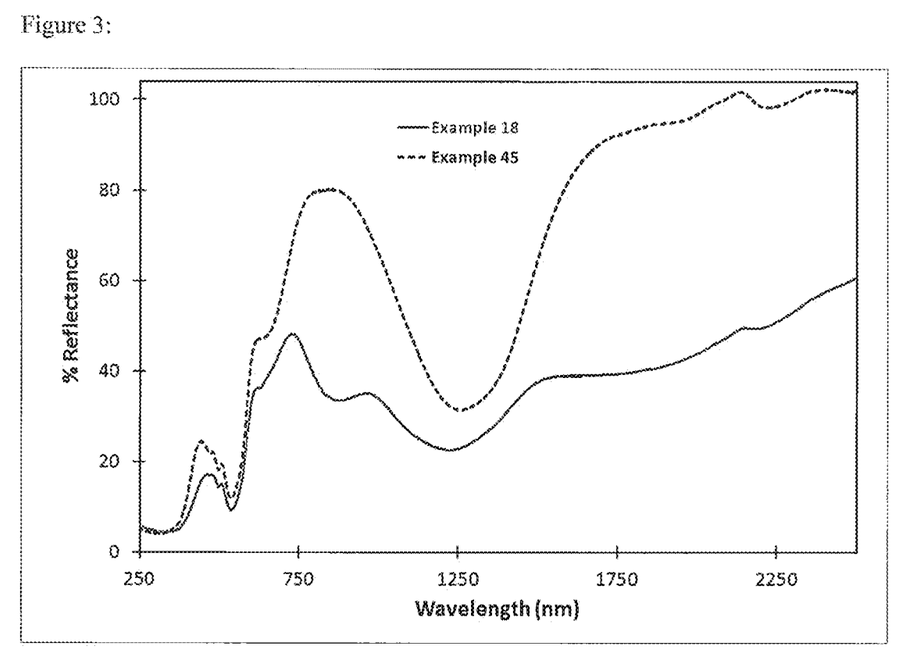
FIG. 3: Reflectance spectra for Examples 18 and 45 measured as calcined (1,150° C.) powders in a cuvette with specular reflectance excluded on a PerkinElmer Lambda 950 UV/Vis/NIR.

Mixtures of cobalt oxide ($Co_3O_4$), lithium carbonate ($Li_2CO_3$), antimony trioxide ($Sb_2O_3$), cupric oxide (CuO), magnesium carbonate ($MgCO_3$), molybdenum oxide ($MoO_3$), tungsten oxide ($WO_3$), and titanium oxide ($TiO_2$) were weighed out in proportions according to the molar amounts listed in Table 3. The mixtures were homogenized by mortar and pestle and calcined in air at 1,100° C. for 4 hours. After firing, the color of the final product is listed in Table 5 and ranged from pastel pink to pastel red. See the reflectance spectrum for Example 18 in FIG. 3.

Examples 19-27

Mixtures of cobalt hydroxide ($Co(OH)_2$), lithium carbonate ($Li_2CO_3$), antimony trioxide ($Sb_2O_3$), cuprous oxide ($Cu_2O$), magnesium carbonate ($MgCO_3$), nickel oxide (NiO), niobium pentoxide oxide ($Nb_2O_5$), and zinc oxide (ZnO) were weighed out in proportions according to the molar amounts listed in Table 4. The mixtures were homogenized by mortar and pestle and calcined in air at 1,150° C. for 4 hours. After firing, the color of the final product is listed in Table 5 and ranged from red shade violet to pastel red.

Example 28

A mixture of cobalt carbonate ($CoCO_3$), lithium carbonate ($Li_2CO_3$), and antimony pentoxide ($Sb_2O_5$) were weighed out in proportions according to the molar amounts listed in Table 4. The mixture was homogenized by mortar and pestle and calcined under flowing argon at 800° C. for 4 hours. After firing, the color of the final product is light purple (see Table 5 for color data).

Examples 29-37

Mixtures of cobalt hydroxide ($Co(OH)_2$), lithium carbonate ($Li_2CO_3$), antimony trioxide ($Sb_2O_3$), were weighed out in proportions according to the molar amounts listed in Table 6. The mixtures were homogenized by mortar and pestle and calcined in air at 1,150° C. for 4 hours. After firing, the color of the final product is listed in Table 6 and ranged from bright pink to purple.

Examples 38-52

Figure 4:
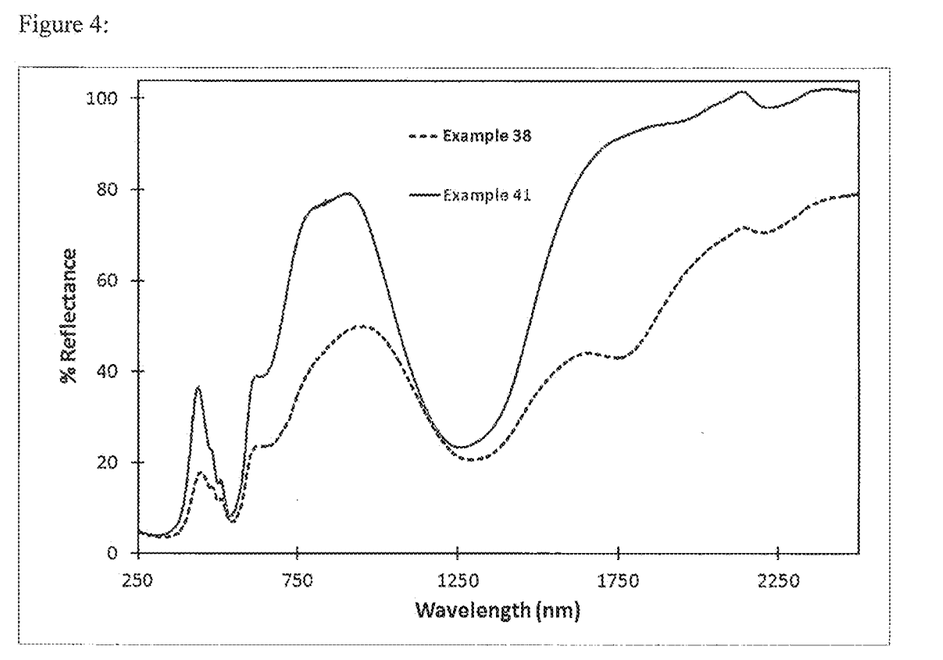
FIG. 4: Reflectance spectra for Examples 38 and 41 measured as calcined (1,150° C.) powders in a cuvette with specular reflectance excluded on a PerkinElmer Lambda 950 UV/Vis/NIR.

Mixtures of cobalt oxide ($Co_3O_4$), lithium carbonate ($Li_2CO_3$), antimony trioxide ($Sb_2O_3$), were weighed out in proportions according to the molar amounts listed in Table 6. The mixtures were homogenized by mortar and pestle and calcined in air at 1,150° C. for 4 hours. After firing, the color of the final product is listed in Table 6 and ranged from violet to pastel red. See reflectance spectra for Examples 38 and 41 in FIG. 4. See the reflectance spectrum for Example 45 in FIG. 3.

TABLE 2

Pigment composition and reaction temperature for Examples 1 to 9.

| Example | Mol Li | Mol Sb | Mol Co oxide | Mol Co carbonate | Mol Co hydroxide | Mol $Cu^{1+}$ | Mol Na | Mol K | Firing Temperature |
|---|---|---|---|---|---|---|---|---|---|
| 1 | 1.00 | 2.00 | 1.00 | | | | | | 1,100° C. |
| 2 | 1.00 | 2.00 | | 1.00 | | | | | 1,100° C. |
| 3 | 1.00 | 2.00 | | | 1.00 | | | | 1,100° C. |
| 4 | 0.90 | 2.00 | | 1.00 | | 0.10 | | | 1,100° C. |
| 5 | 0.75 | 2.00 | | 1.00 | | 0.25 | | | 1,100° C. |
| 6 | 0.90 | 2.00 | 1.00 | | | | 0.10 | | 1,100° C. |
| 7 | 0.75 | 2.00 | 1.00 | | | | 0.25 | | 1,100° C. |
| 8 | 0.90 | 2.00 | 1.00 | | | | | 0.10 | 1,100° C. |
| 9 | 0.75 | 2.00 | 1.00 | | | | | 0.25 | 1,100° C. |

TABLE 3

Pigment composition and reaction temperature for Examples 10 to 18.

| Example | Mol Li | Mol Sb | Mol Co oxide | Mol Mg | Mol Mo | Mol W | Mol $Cu^{2+}$ | Mol Ti | Firing Temperature |
|---|---|---|---|---|---|---|---|---|---|
| 10 | 2.00 | 4.00 | 1.00 | 1.00 | | | | | 1,100° C. |
| 11 | 2.00 | 4.00 | 0.50 | 1.50 | | | | | 1,100° C. |
| 12 | 2.00 | 4.00 | 0.25 | 1.75 | | | | | 1,100° C. |
| 13 | 2.00 | 4.00 | | 2.00 | | | | | 1,100° C. |
| 14 | 2.00 | 3.75 | 2.00 | | 0.25 | | | | 1,100° C. |
| 15 | 2.00 | 3.75 | 2.00 | | | 0.25 | | | 1,100° C. |
| 16 | 2.00 | 3.50 | 2.00 | | 0.25 | | | 0.25 | 1,100° C. |
| 17 | 2.00 | 3.50 | 2.00 | | | 0.25 | | 0.25 | 1,100° C. |
| 18 | 2.00 | 4.00 | 1.50 | | | | 0.50 | | 1,100° C. |

TABLE 4

Pigment composition and reaction temperature for Examples 19 to 28.

| Example | Mol Li | Mol Sb | Mol Co hydroxide | Mol $Cu^{2+}$ | Mol Ni | Mol Nb | Mol Mg | Mol Zn | Firing Temperature |
|---|---|---|---|---|---|---|---|---|---|
| 19 | 1.00 | 1.75 | 1.00 | | | 0.25 | | | 1,150° C. |
| 20 | 1.00 | 1.50 | 1.00 | | | 0.50 | | | 1,150° C. |
| 21 | 1.00 | 2.00 | 0.80 | 0.20 | | | | | 1,055° C. |
| 22 | 1.00 | 2.00 | 0.80 | | 0.20 | | | | 1,150° C. |
| 23 | 1.00 | 2.00 | 0.90 | | | | 0.10 | | 1,150° C. |
| 24 | 1.00 | 2.00 | 0.75 | | | | 0.25 | | 1,150° C. |
| 25 | 1.00 | 2.00 | 0.50 | | | | 0.50 | | 1,150° C. |
| 26 | 1.00 | 2.00 | 0.90 | | | | | 0.10 | 1,150° C. |
| 27 | 1.00 | 2.00 | 0.75 | | | | | 0.25 | 1,150° C. |
| Example | Mol Li | | Mol Co carbonate | Mol Sb Sb2O5 | | | | | Firing Conditions |
| 28 | 1.00 | | 0.90 | 2.00 | | | | | 800° C.-Argon |

TABLE 5

CIE color values for Examples 1 to 28 pleasured as calcined powders in a cuvette with spectral reflectance excluded on a PerkinElmer Lambda 950 UV/Vis/NIR with D65 illuminant and 10° Standard Observer along with a general color descriptor.

| Example | L* | a* | b* | C* | h | Color |
|---|---|---|---|---|---|---|
| 1 | 53.9 | 34.9 | −16.6 | 38.6 | 334.6 | Bright pink |
| 2 | 60.7 | 31.0 | −10.3 | 32.6 | 341.7 | Light pink |
| 3 | 53.2 | 32.1 | −12.7 | 34.5 | 338.3 | Bright pink |
| 4 | 55.2 | 29.4 | −2.6 | 29.5 | 354.9 | Pastel red |
| 5 | 51.4 | 27.6 | 5.7 | 28.2 | 11.6 | Pastel red |
| 6 | 55.1 | 34.0 | −16.0 | 37.6 | 334.8 | Bright pink |
| 7 | 55.8 | 33.2 | −16.6 | 37.1 | 333.4 | Bright pink |
| 8 | 51.2 | 26.0 | −9.3 | 27.6 | 340.4 | Dull pink |
| 9 | 47.6 | 13.4 | −4.6 | 14.2 | 340.9 | Dull violet |
| 10 | 68.5 | 27.6 | −11.5 | 29.9 | 337.4 | Light pink |
| 11 | 76.8 | 20.9 | −7.8 | 22.3 | 339.7 | Very light pink |
| 12 | 81.7 | 17.1 | −7.0 | 18.4 | 337.7 | Pastel pink |
| 13 | 99.1 | 0.7 | 0.1 | 0.7 | 8.3 | White |
| 14 | 52.9 | 27.9 | 0.1 | 27.9 | 0.2 | Pastel red |
| 15 | 55.9 | 23.6 | 6.5 | 24.5 | 15.4 | Pastel red |
| 16 | 42.6 | 21.3 | −0.9 | 21.3 | 357.6 | Red shade violet |
| 17 | 43.9 | 19.3 | 4.9 | 19.9 | 14.3 | Light red/brown |
| 18 | 49.5 | 25.9 | 5.8 | 26.6 | 12.7 | Pastel red |
| 19 | 42.4 | 28.9 | −12.0 | 31.3 | 337.4 | Red shade violet |
| 20 | 35.8 | 13.9 | −4.8 | 14.8 | 340.9 | Violet |
| 21 | 53.4 | 26.3 | 2.7 | 26.4 | 6.0 | Pastel red |
| 22 | 45.6 | 29.4 | −3.8 | 29.6 | 352.6 | Red shade violet |
| 23 | 53.1 | 34.5 | −13.9 | 37.1 | 338.1 | Pink |
| 24 | 57.1 | 32.9 | −12.6 | 35.2 | 339.1 | Light pink |
| 25 | 67.0 | 27.4 | −10.9 | 29.5 | 338.3 | Pastel pink |
| 26 | 48.3 | 34.5 | −13.1 | 36.9 | 339.2 | Pink |
| 27 | 47.0 | 32.4 | −9.3 | 33.7 | 343.9 | Pink |
| 28 | 63.5 | 4.1 | −24.2 | 24.5 | 279.6 | Light purple |

TABLE 6

Pigment composition data and CIE color values for Examples 29 to 52 measured as calcined (1,150° C.) powders in a cuvette with spectral reflectance excluded on a PerkinElmer Lambda 950 UV/Vis/NIR with D65 illuminant and 10° Standard Observer along with a general color descriptor.

| Example | Mol Li | Mol Sb | Mol Co hydroxide | L* | a* | b* | C* | h | Color |
|---|---|---|---|---|---|---|---|---|---|
| 29 | 28.6 | 42.9 | 28.6 | 38.8 | 6.5 | −8.8 | 10.9 | 306.7 | Purple |
| 30 | 25.0 | 50.0 | 25.0 | 53.1 | 32.0 | −9.8 | 33.5 | 342.9 | Bright pink |
| 31 | 33.3 | 44.4 | 22.2 | 32.8 | 10.3 | −5.1 | 11.5 | 333.8 | Dark burgandy |
| 32 | 29.4 | 47.1 | 23.5 | 41.0 | 25.5 | −9.2 | 27.2 | 340.2 | Red shade violet |
| 33 | 25.0 | 50.0 | 25.0 | 50.6 | 34.5 | −13.3 | 37.0 | 339.0 | Bright pink |
| 34 | 20.0 | 40.0 | 40.0 | 31.6 | 8.0 | −6.8 | 10.5 | 319.5 | Red shade purple |
| 35 | 22.2 | 44.4 | 33.3 | 40.4 | 20.6 | −12.5 | 24.1 | 328.8 | Red shade violet |
| 36 | 23.5 | 47.1 | 29.4 | 45.6 | 28.4 | −11.7 | 30.7 | 337.7 | Red shade violet |
| 37 | 25.0 | 50.0 | 25.0 | 48.2 | 32.6 | −11.6 | 34.7 | 340.4 | Bright pink |

| Example | Mol Li | Mol Sb | Mol Co oxide | L* | a* | b* | C* | h | Color |
|---|---|---|---|---|---|---|---|---|---|
| 38 | 15.0 | 50.0 | 35.0 | 42.4 | 22.2 | −7.1 | 23.3 | 342.3 | Red shade violet |
| 39 | 20.0 | 50.0 | 30.0 | 52.8 | 35.7 | −17.5 | 39.7 | 333.9 | Bright pink |
| 40 | 25.0 | 50.0 | 25.0 | 53.6 | 35.7 | −16.1 | 39.1 | 335.7 | Bright pink |
| 41 | 30.0 | 50.0 | 20.0 | 50.5 | 36.2 | −17.6 | 40.3 | 334.1 | Bright pink |
| 42 | 35.0 | 50.0 | 15.0 | 54.5 | 34.9 | −15.6 | 38.3 | 335.9 | Pink |
| 43 | 25.3 | 50.6 | 24.1 | 54.4 | 34.0 | −11.7 | 35.9 | 341.1 | Bright pink |
| 44 | 25.6 | 51.3 | 23.1 | 55.4 | 31.3 | −4.0 | 31.5 | 352.7 | Pastel Red |
| 45 | 26.0 | 51.9 | 22.1 | 55.2 | 30.0 | 1.3 | 30.0 | 2.4 | Pastel Red |
| 46 | 31.0 | 46.0 | 23.0 | 36.6 | 10.3 | −9.9 | 14.3 | 316.2 | Violet |
| 47 | 29.4 | 47.1 | 23.5 | 39.3 | 14.8 | −10.1 | 17.9 | 325.6 | Violet |
| 48 | 27.1 | 48.2 | 24.1 | 45.1 | 20.9 | −11.2 | 23.7 | 331.7 | Red shade violet |
| 49 | 27.5 | 50.0 | 22.5 | 53.0 | 35.7 | −17.0 | 39.6 | 334.5 | Bright pink |
| 50 | 28.8 | 50.0 | 21.3 | 53.4 | 35.6 | −17.0 | 39.5 | 334.5 | Bright pink |
| 51 | 22.5 | 50.0 | 27.5 | 53.8 | 36.2 | −18.2 | 40.5 | 333.3 | Bright pink |
| 52 | 21.3 | 50.0 | 28.8 | 53.2 | 36.2 | −18.6 | 40.7 | 332.7 | Bright pink |

Example 1 Reflectance Spectra/Color

Example 1 was ground to a pigmentary particle size (>5 μm) and introduced into a clear acrylic paint. The acrylic masstone paint was prepared by introducing 1.95 grams of pigment into 3.53 grams of a clear modified acrylic resin solution (46.6 resin weight percent). The paint was then drawn down with a 10 mil—wet film applicator on a Leneta card (form 2DX brushout card) that was half white and half black. The cards were air dried for 30 minutes prior to drying in an oven at 60° C. for 45 minutes. The reflectance as a function of wavelength measurements were measured on acrylic masstone drawdowns over the white and black portions of the Leneta cards using a Perkin Elmer Lambda 900 spectrophotometer with specular reflectance included. The resulting reflectance curves are displayed below in FIG. 5. PVDF/Acrylic masstone and 1:1 tint coatings were also prepared using pigments from Example 1 at the particle size value listed in Table 7. The coatings were applied to primed aluminum substrates with a final dry film thickness of 2.2 mil.

TABLE 7

CIE color data for Examples 1 made on PVDF/acrylic masstone drawdowns with a 2.2 mil dry film thickness over primed aluminum. Color measurements were made on a Datacolor 600 reflection spectrophotometer with specular reflectance included with D65 illuminant and 10° Standard Observer. The particle size measurement was made using a Microtrac S3500.

| PVDF Acrylic | Masstone | | | 1 to 1 Tint | | | Particle size |
|---|---|---|---|---|---|---|---|
| D65 10° Observer | L* | a* | b* | L* | a* | b* | Mean (μm) |
| Example 1 | 53.5 | 27.3 | −13.9 | 85.19 | 10.68 | −6.64 | 3.27 |

Figure 6:
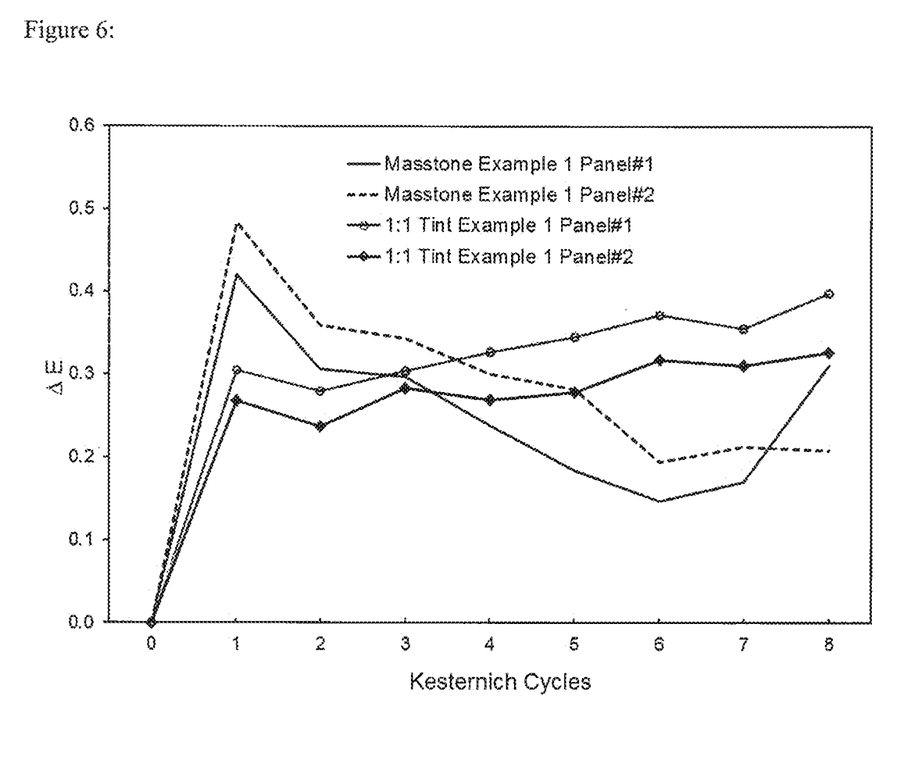
FIG. 6: ΔE as a function of time over eight Kesternich cycles for PVDF/Acrylic masstone and 1:1 Tint drawdowns of Example 1 on primed aluminum panels.
Figure 7:
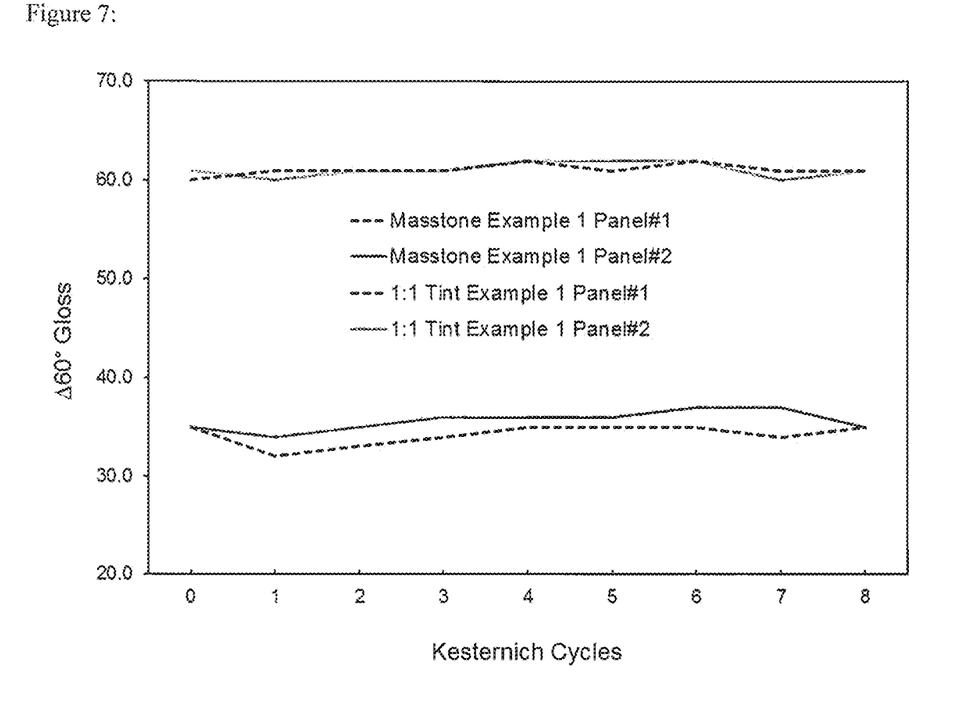
FIG. 7: Δ60° Gloss as a function of time over eight Kesternich cycles for PVDF/Acrylic masstone and 1:1 Tint drawdowns of Example 1 on primed aluminum panels.

Acid/Base Stability:

Modified Kesternich (DIN 50018) testing was performed on Example 1 in which primed aluminum panels coated with PVDF/acrylic underwent a series of 7-hour exposures to a sulfur dioxide atmosphere followed by measurements of color and gloss. The color measurements were performed on a Datacolor 600 reflection spectrophotometer and 60° gloss measurements were performed using a BYK Gardner Micro Tri-gloss meter. The full Kesternich testing included a total of 8 cycles of 7-hour exposure to sulfur dioxide. The color and gloss changes that occurred over these 8 cycles are displayed in FIGS. 6 and 7 below. The change in color ΔE is derived from the equation $\Delta E = \sqrt{(\Delta L^*)^2 + (\Delta a^*)^2 + (\Delta b^*)^2}$, where ΔL*, Δa*, and Δb* are the color change with respect to the panel prior to acid exposure. FIGS. 6 and 7 below show that ΔE does not change significantly after the first cycle.

Figure 8:
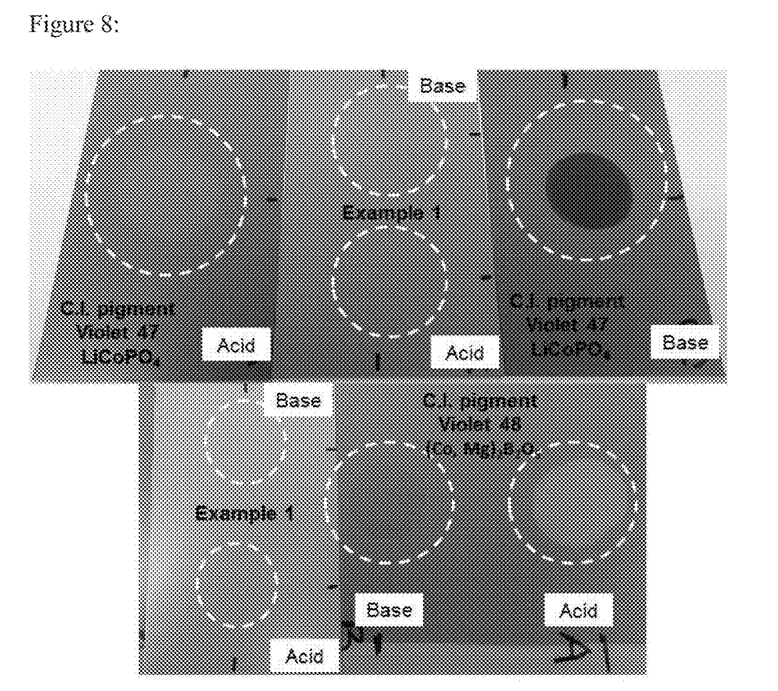
FIG. 8: Acid/base testing on C.I. Pigment Violet 47 ($LiCoPO_4$), C.I. Pigment Violet 48 (($Co, Mg)_2B_2O_5$), and Example 1 in PVDF/acrylic coatings on primed aluminum panels. The top figure compares Example 1 to C.I. Pigment Violet 47 following exposure to 5% HCl or 5% NaOH solutions for 7 days. The bottom figure compares Example 1 to C.I. Pigment Violet 48 following exposure to 5% HCl or 5% NaOH solutions for 7 days. The spots on the panel that were exposed to acid and base are circled.

Along with standard Kesternich testing an additional acid/base stability test was performed on Example 1. During this test PVDF/acrylic panels of Example 1, C.I. Pigment Violet 47 (LiCoPO$_4$), and C.I. Pigment Violet 48 ((Co, Mg)$_2$B$_2$O$_5$) were exposed to 5% solutions of HCl and NaOH. During the test 1 milliliter aliquots of 5% HCl and 5% NaOH solutions are placed on two separate spots on each panel and then covered with watch glasses. After 24 hours of exposure the solutions are removed and the panels are cleaned and evaluated for signs of failure or color change. Once evaluated, the acid/base solutions are placed back on the same spots on the panels and this process continues for seven days. The results of this testing are displayed in FIG. 8 below and show that following seven days of exposure Example 1 is unchanged while both Pigment Violet 47 and 48 have bleached with acid exposure and turned red or black with exposure to base. To illustrate this difference further Table 8 below displays the color change ΔE* for all three sets of samples. The superior stability of Example 1 stands out with a ΔE*<0.3 compared to ΔE* values of 7 or greater for Pigment Violet 47 and 48.

TABLE 8

CIE color data for the exposure of PVDF/acrylic panels to acid and base solutions. The change in color is reported as ΔL*, Δa*, Δb*, and ΔE* for Example 1, Pigment Violet 48, and Pigment Violet 47. Color measurements were made on Datacolor 600 reflection spectrophotometer with specular reflectance included with D65 illuminant and 10° Standard Observer

| | L* | a* | b* | C* | h* |
|---|---|---|---|---|---|
| Example 1 | 53.53 | 27.20 | −13.98 | 30.58 | 332.80 |
| After 7 days exposure | ΔL* | Δa* | Δb* | ΔE* | |
| Base | −0.07 | −0.06 | 0.17 | 0.19 | |
| Acid | 0.01 | −0.16 | 0.16 | 0.23 | |

TABLE 8-continued

CIE color data for the exposure of PVDF/acrylic panels to acid and base solutions. The change in color is reported as ΔL*, Δa*, Δb*, and ΔE* for Example 1, Pigment Violet 48, and Pigment Violet 47. Color measurements were made on Datacolor 600 reflection spectrophotometer with specular reflectance included with D65 illuminant and 10° Standard Observer

| | L* | a* | b* | C* | h* |
|---|---|---|---|---|---|
| C.I. Pigment Violet 47 (LiCoPO4) | 44.06 | 32.77 | −34.89 | 47.87 | 319.78 |
| After 7 days exposure | ΔL* | Δa* | Δb* | ΔE* | |
| Base | −9.30 | −17.87 | 23.76 | 31.15 | |
| Acid | 4.60 | −4.09 | 3.89 | 7.28 | |
| | L* | a* | b* | C* | h* |
| C.I. Pigment Violet 48 ((Co, Mg)2B2O5) | 41.79 | 29.92 | −31.84 | 43.70 | 320.37 |
| After 7 days exposure | ΔL* | Δa* | Δb* | ΔE* | |
| Base | −1.99 | −8.25 | 15.42 | 17.60 | |
| Acid | 8.43 | −7.20 | 5.49 | 12.37 | |

Weathering:

Accelerated weathering measurements were performed with a QUV machine that included UV (UVA-340 lamp) and moisture exposure. Test panels used for accelerated weathering are the same as the PVDF/acrylic drawdowns used for the modified Kesternich testing above. Color measurements were performed on a Datacolor 600 reflection spectrophotometer (D65 illuminant and 10° Standard Observer) and 60° gloss measurements were performed using a BYK Gardner Micro Tri-gloss meter. Table 9 below shows the accelerated weather data at 1,000 and 5,000 hours for Example 1 and C.I. Pigment Violet 14 (Shepherd Color Violet 92). The data shows that Example 1 is much more stable than C.I. Pigment Violet 14 over the 5,000 hr test duration.

The pink and violet pigments derived from the Li—Co—Sb oxide phase space show significant improvements in chemical and weathering stability over commercially available violet pigments. The materials of this technology are such that they meet current industry performance standards for long term durability expected from complex inorganic pigments.

TABLE 9

Accelerated weathering data for Example 1 compared to Shepherd Color Violet 92 at 1,000 and 5,000 hours for two different test panels. Test panels were masstone drawdowns of PVDF/acrylic on primed aluminum and 1:1 Tint drawdowns of PVDF/acrylic on primed aluminum.

| | | | Initial Color | | | | QUV Accelerated Weathering | | | | | | | | |
|---|---|---|---|---|---|---|---|---|---|---|---|---|---|---|---|
| | | | | | | | 1000 hrs | | | | | 5000 hrs | | | |
| PREP | Sample | Panel# | CIE L* | CIE a* | CIE b* | 60° Gloss | DL* | Da* | Db* | DE* | D60° Gloss | DL* | Da* | Db* | DE* | D60° Gloss |
| PVDF/ Acrylic Masstone | Example 1 | 1 | 53.6 | 27.4 | −14.0 | 33 | 0.1 | 0.6 | −0.7 | 1.0 | −1 | −0.2 | 0.5 | −0.6 | 0.8 | −4 |
| | | 2 | 53.6 | 27.4 | −14.0 | 32 | 0.1 | 0.7 | −0.7 | 1.0 | −1 | −0.1 | 0.6 | −0.6 | 0.9 | −4 |
| PVDF/ Acrylic 1:1 Tint | Example 1 | 1 | 85.1 | 11.0 | −7.1 | 65 | −0.1 | 0.4 | −0.3 | 0.5 | 0 | −0.3 | 0.3 | 0.0 | 0.4 | −3 |
| | | 2 | 85.1 | 11.1 | −7.1 | 66 | −0.1 | 0.4 | −0.3 | 0.5 | −1 | −0.3 | 0.3 | 0.0 | 0.4 | −3 |
| PVDF/ Acrylic Masstone | Violet 92 (C.I. pigment violet 14) | 1 | 28.3 | 29.3 | −32.0 | 15 | 1.2 | −1.3 | 1.3 | 2.1 | 0 | 2.1 | −3.5 | 1.3 | 4.2 | 1 |
| | | 2 | 28.4 | 29.3 | −32.1 | 15 | 1.1 | −1.3 | 1.3 | 2.2 | 0 | 1.8 | −3.5 | 1.2 | 4.1 | 1 |

What is claimed:

1. An inorganic pigment having a molar ratio: $(A_2O)_x(BO)_y(C_2O_5)_z(DO_3)_w(EO_2)_v$, where:
   $5 \leq x \leq 20$
   $10 \leq y \leq 45$
   $17 \leq z \leq 30$
   $0 \leq w \leq 5$,
   $0 \leq v \leq 5$; and
   where $2x+y+2z+w+v \cong 100$;
   and where A is Li or Li in combination with Cu, Na, K, or combinations thereof; where B is Co, or Co in combination with Ca, Cu, Fe, Mg, Mn, Ni, Sn, Zn, or combinations thereof; where C is one or more of Nb, Sb, or combination thereof; where D is one or more of Mo, W or combination thereof; where E is one or more of Sn, Ti, Zr, or combination thereof.

2. The inorganic pigment of claim 1 having the molar ratio:
   $(A_2O)_x(BO)_y(C_2O_5)_z(DO_3)_w(EO_2)_v$, where:
   $7 \leq x \leq 17.5$
   $15 \leq y \leq 40$
   $20 \leq z \leq 26$
   $0 \leq w \leq 5$,
   $0 \leq v \leq 5$; and
   where $2x+y+2z+w+v \cong 100$.

3. The inorganic pigment of claim 2, where greater than 50 atomic % of A is Li.

4. The inorganic pigment of claim 2, where greater than 50 atomic % of B is Co.

5. The inorganic pigment of claim 2, where greater than 50 atomic % of C is Sb.

6. The inorganic pigment of claim 2, where A is Li, B is Co and C is Sb.

7. The inorganic pigment of claim 2, where at least 5 atomic % of A is Cu, Na, or K.

8. The inorganic pigment of claim 2, where at least 5 atomic % of B is Cu, Ni, Mg, or Zn.

9. The inorganic pigment of claim 2, where at least 5 atomic % of C is Nb.

10. The inorganic pigment of claim 2, where w>0.

11. The inorganic pigment of claim 2, where v>0.

12. The inorganic pigment of claim 2, where v=w and v>0.

13. The inorganic pigment of claim 2 having a dopant addition of Al, B, Ba, Bi, Ca, Ce, Cr, La, P, Pr, Si, Sr, Ta, V, or Y, where the dopant concentration represents 5 atomic % or less of the total number of moles of components A+B+C+D+E.

14. The inorganic pigment of claim 1, having a molar ratio $(A_2O)_x(BO)_y(C_2O_5)_z(DO_3)_w(EO_2)_v$, where:
   $10 \leq x \leq 15$
   $20 \leq y \leq 30$
   $20 \leq z \leq 26$
   $0 \leq w \leq 5$,
   $0 \leq v \leq 5$, and
   where $2x+y+2z+w+v \cong 100$.

15. The inorganic pigment of claim 14, where greater than 50 atomic % of A is Li.

16. The inorganic pigment of claim 14, where greater than 50 atomic % of B is Co.

17. The inorganic pigment of claim 14, where greater than 50 atomic % of C is Sb.

18. The inorganic pigment of claim 14, where A is Li, B is Co and C is Sb.

19. The inorganic pigment of claim 14, where at least 5 atomic % of A is Cu, Na, or K.

20. The inorganic pigment of claim 14, where at least 5 atomic % of B is Cu, Ni, Mg, or Zn.

21. The inorganic pigment of claim 14, where at least 5 atomic % of C is Nb.

22. The inorganic pigment of claim 14, where w>0.

23. The inorganic pigment of claim 14, where v>0.

24. The inorganic pigment of claim 14, where v=w and v>0.

25. The inorganic pigment of claim 14 having a dopant addition of Al, B, Ba, Bi, Ca, Ce, Cr, La, P, Pr, Si, Sr, Ta, V, or Y where the dopant concentration represents 5 atomic % or less of the total number of moles of components A+B+C+D+E.

* * * * *